(12) United States Patent
Lee et al.

(10) Patent No.: US 8,666,143 B2
(45) Date of Patent: Mar. 4, 2014

(54) IMAGE PROCESSING APPARATUS AND METHOD

(75) Inventors: Seok Lee, Yongin-si (KR); Ho Cheon Wey, Seongnam-si (KR); Il Soon Lim, Hongseong-gun (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 652 days.

(21) Appl. No.: 12/923,828

(22) Filed: Oct. 8, 2010

(65) Prior Publication Data

US 2011/0188739 A1 Aug. 4, 2011

(30) Foreign Application Priority Data

Feb. 3, 2010 (KR) ........................ 10-2010-0010096

(51) Int. Cl.
*G06K 9/00* (2006.01)
(52) U.S. Cl.
USPC ........................................................ 382/154
(58) Field of Classification Search
None
See application file for complete search history.

(56) References Cited

U.S. PATENT DOCUMENTS

| | | | | |
|---|---|---|---|---|
| 8,384,763 B2* | 2/2013 | Tam et al. | ........................ | 348/43 |
| 8,482,654 B2* | 7/2013 | Lipton et al. | .................. | 348/340 |
| 2011/0216160 A1* | 9/2011 | Martin | .............. | 348/40 |
| 2011/0310230 A1* | 12/2011 | Cheng | .............. | 348/49 |

FOREIGN PATENT DOCUMENTS

| | | |
|---|---|---|
| JP | 10-336703 | 12/1998 |
| JP | 2008-109267 | 5/2008 |
| KR | 10-2007-0061227 | 6/2007 |
| KR | 10-2009-0040032 | 4/2009 |

* cited by examiner

*Primary Examiner* — Samir Ahmed
(74) *Attorney, Agent, or Firm* — Staas & Halsey LLP

(57) ABSTRACT

An image processing apparatus that configures a single frame by determining a central image of a certain viewpoint as an original resolution, and frame another single frame by combining a left image of a left viewpoint and a right image of a right viewpoint. The image processing apparatus may generate three-dimensional (3D) image data configured using the frames, and may encode, decode, and render an image based on the 3D image data.

7 Claims, 8 Drawing Sheets

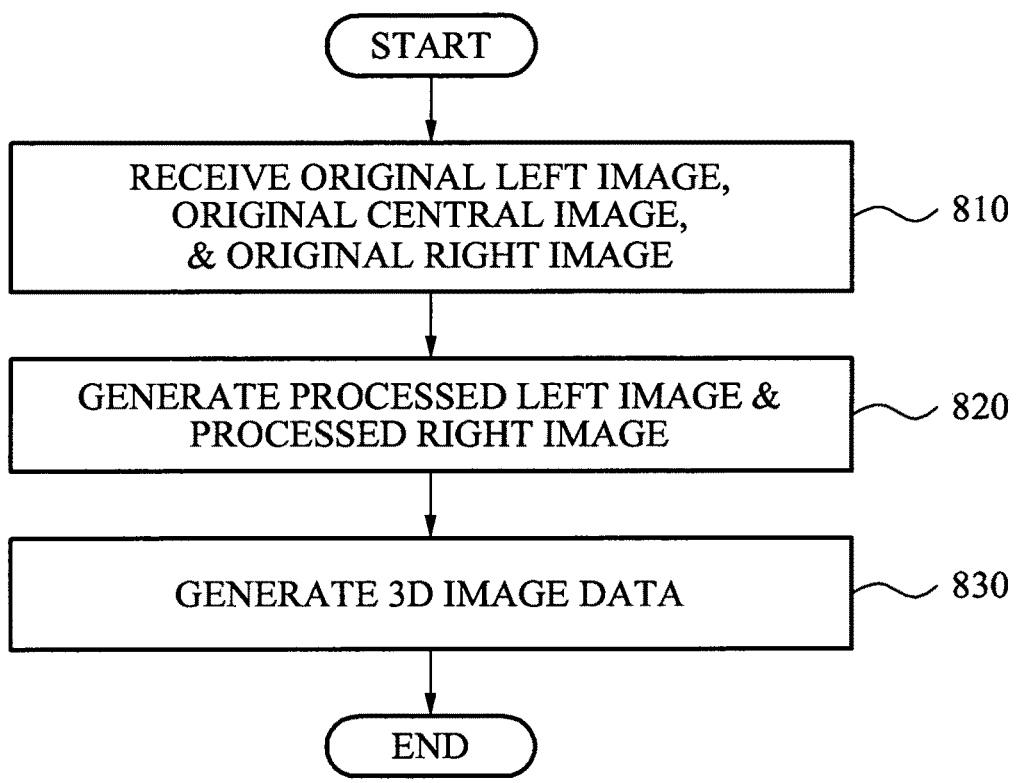

IMAGE PROCESSING APPARATUS AND METHOD

CROSS-REFERENCE TO RELATED APPLICATIONS

This application claims the benefit of Korean Patent Application No. 10-2010-0010096, filed on Feb. 3, 2010, in the Korean Intellectual Property Office, the disclosure of which is incorporated herein by reference.

BACKGROUND

1. Field

One or more embodiments relate to an image processing apparatus and method, and more particularly, to technology that may process an image based on three-dimensional (3D) image data containing an original resolution of a central image, and a processed left image and a processed right image.

2. Description of the Related Art

Three-dimensional (3D) image data may include video data photographed at a plurality of viewpoints, and depth data indicating a distance between a subject and a camera. The 3D image data may be transformed to a predetermined format and be stored. The 3D image data may be compressed and be transmitted to a user. A reception end may play the 3D image data using one of a two-dimensional (2D) image, a stereo type 3D image, and a multi-view image depending on the user's purpose and a type of a display.

Accordingly, there is a desire for method and apparatus that may play one of a 2D image, a stereo type 3D image, and a multi-view image using an existing broadcasting infra and without loss of resolution.

SUMMARY

According to an aspect of one or more embodiments, there may be provided an image processing apparatus including an image input unit to receive an original left image, an original central image, and an original right image, an image processor to generate a processed left image and a processed right image by processing the original left image and the original right image, and an image generator to generate three-dimensional (3D) image data including a first frame image and a second frame image, the first frame image configured using the original central image and the second frame image configured using the processed left image and the processed right image.

The image processor may generate the processed left image and the processed right image by reducing, by half, a vertical resolution of the original left image and a vertical resolution of the original right image.

The 3D image data may further include auxiliary data including at least one of depth image data corresponding to each viewpoint image, segmentation information, and transparency information, and metadata including at least one of camera parameter information and depth range information.

The 3D image data may further include filter information including history information regarding the original left image and the original right image being processed to the processed left image and the processed right image.

The image processing apparatus may further include an image adder to add two-dimensional (2D) image data to the original central image when a 2D image is added, to add stereo image data to the original left image and the original right image when a stereo image is added, and to add multi-view image data to the original central image, the original left image, and the original right image when a multi-view image is added.

The image processing apparatus may further include an encoder to encode the 3D image data.

According to another aspect of one or more embodiments, there may be provided an image processing apparatus including an image separator to separate a first frame image and a second frame image from an encoded image, a mode selector to select an output mode, a 2D output unit to output a 2D image by decoding the first frame image when the selected output mode is a 2D output mode, a stereo output unit to output a stereo image by decoding the second frame image when the selected output mode is a stereo output mode, and a multi-view output unit to output a multi-view image by decoding the first frame image and the second frame image and by generating at least one new viewpoint image when the selected output mode is a multi-view output mode.

The first frame image may be configured using an original central image and the second frame image may be configured using a processed left image and a processed right image obtained by processing an original left image and an original right image.

The processed left image may correspond to an image generated by reducing a vertical resolution of the original left image by half. The processed right image may correspond to an image generated by reducing a vertical resolution of the original right image by half.

The multi-view output unit may include a multi-view decoder to decode the first frame image and the second frame image, and an image generator to generate at least one new viewpoint image. The image generator may include an image selector to determine, as a first image, one image selected from the processed left image and the processed right image, a warping unit to three-dimensionally warp the first image and the original central image, and an image blender to blend an image for correcting a hole of the warped original central image.

The image blender may include an image interpolator to restore an original resolution by interpolating the warped first image. A new viewpoint image may be generated by blending the interpolated first image and the warped original central image.

The image interpolator may interpolate the first image based on filter information containing history information regarding the original left image or the original right image being processed.

According to still another aspect of one or more embodiments, there may be provided an image processing apparatus including a warping unit to three dimensionally warp a first viewpoint image of a first resolution and a second viewpoint image of a second resolution, an image processor to generate a correction image by processing the warped second viewpoint image, and an image blender to generate a new viewpoint image by blending the warped first viewpoint image and the correction image.

According to yet another general aspect of one or more embodiments, there may be provided an image processing method including receiving an original left image, an original central image, and an original right image, generating a processed left image and a processed right image by processing the original left image and the original right image, and generating 3D image data including a first frame image and a second frame image, the first frame image configured using the original central image and the second frame image configured using the processed left image and the processed right image.

Additional aspects, features, and/or advantages of exemplary embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which:

FIG. 8 illustrates an image processing method to generate 3D image data according to an embodiment.

DETAILED DESCRIPTION

Figure 1:
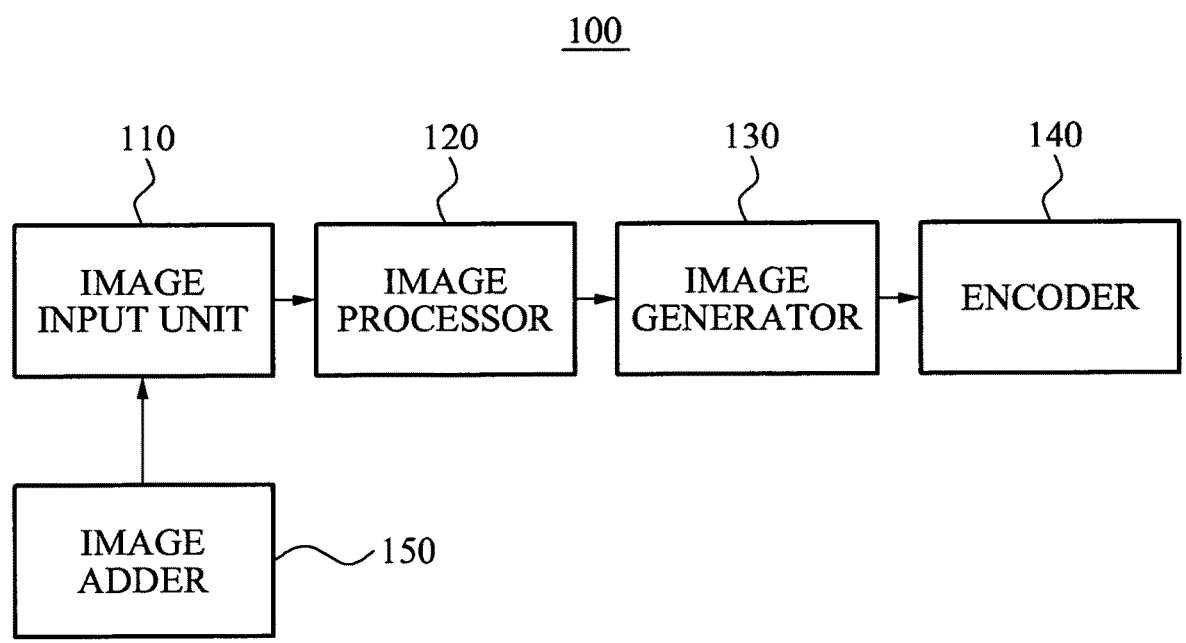
FIG. 1 illustrates an image processing apparatus to generate three-dimensional (3D) image data according to an embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 illustrates an image processing apparatus 100 to generate three-dimensional (3D) image data according to an embodiment.

Referring to FIG. 1, the image processing apparatus 100 to generate the 3D image data may include an image input unit 110, an image processor 120, and an image generator 130.

The image input unit 110 may receive an original left image, an original central image, and an original right image. The original central image denotes an original image photographed at a central viewpoint. The original left image denotes an original image photographed at a left viewpoint based on the central viewpoint. The original right image denotes an original image photographed at a right viewpoint based on the central viewpoint.

The image processor 120 may generate a processed left image and a processed right image by processing the original left image and the original right image. The original left image and the original right image may be transformed and be used. For example, the image processor 120 may generate the processed left image and the processed right image by performing a transformation of reducing a resolution of the original left image and the original right image. A resolution of the processed left image and the processed right image may correspond to half a resolution of the original left image and the original right image.

To reduce the resolution of the original left image and the original right image, the image processor 120 may generate an odd image including odd lines and an even image including even lines by interlacing the original left image and the original right image, and may determine the odd image and the even image as the processed left image and the processed right image.

To reduce the resolution of the original left image and the original right image, the image processor 120 may generate a checkerboard left image having half a resolution of the original left image and a checkerboard right image having half a resolution of the original right image by arranging the original left image and the original right image in a checkerboard type, and may determine the checkerboard left image and the checkerboard right image as the processed left image and the processed right image.

To reduce the resolution of the original left image and the original right image, the image processor 120 may generate the processed left image and the processed right image by reducing a vertical resolution of the original left image and the original right image, and may also generate the processed left image and the processed right image using various types of schemes, for example, a top and down scheme of arranging the generated processed left image and processed right image in top and down, a side by side scheme of arranging the generated processed left image and processed right image in left and right, and the like.

Hereinafter, an example of generating the processed left image and the processed right image will be further described with reference to FIGS. 2 and 3.

Figure 2:
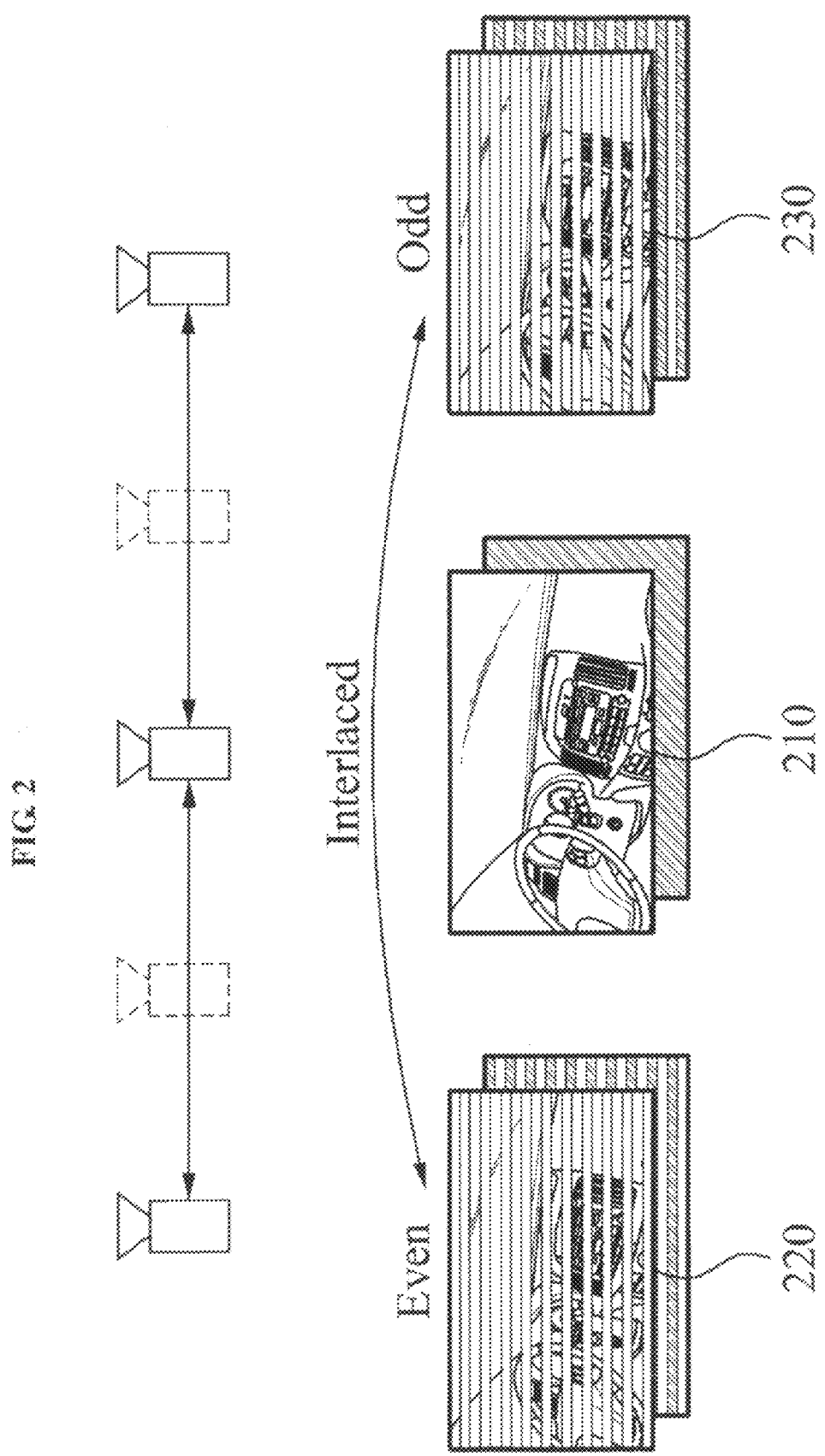
FIG. 2 illustrates a process of generating 3D image data using interlacing according to an embodiment.

FIG. 2 illustrates a process of generating 3D image data using interlacing according to an embodiment.

Referring to FIG. 2, an even image 220 and an odd image 230 may be generated by interlacing an original left image and an original right image of an original central image 210. Specifically, an even image or an odd image among images interlaced from the original left image may be selected as a processed left image. Also, an even image or an odd image among images interfaced from the original right image may be selected as a processed right image. When the even image among the images interlaced from the original left image is selected as the processed left image, the odd image among the images interlaced from the original right image may be selected as the processed right image. Accordingly, when one of the processed left image and the processed right image corresponds to the even image, the remaining image may be selected as the odd image.

Figure 3:
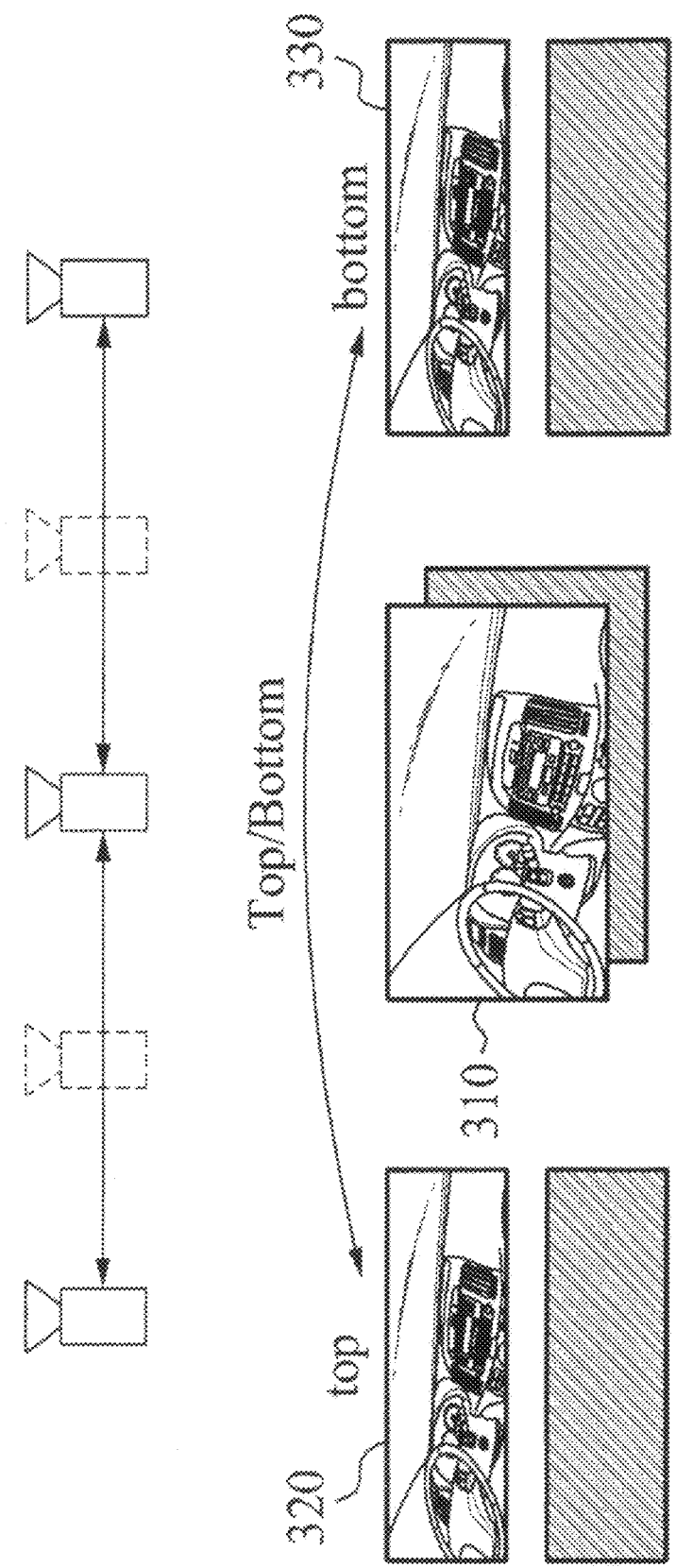
FIG. 3 illustrates a process of generating 3D image data using a top and bottom scheme according to an embodiment.

FIG. 3 illustrates a process of generating 3D image data using a top and bottom scheme according to an embodiment.

Referring to FIG. 3, a top image 320 and a bottom image 330 may be generated by reducing a resolution of an original left image and an original right image of an original central image 310 by half. Specifically, an image generated by reducing the resolution of the original left image by half may be selected as a processed left image, and an image generated by reducing the resolution of the original right image by half may be selected as a processed right image. The selected processed left image or processed right image may be determined as the top image 320 or the bottom image 330 and thereby be configured as a single frame.

Referring again to FIG. 1, the image generator 130 may generate a single frame configured using the processed left image and the processed right image, and another single frame configured using an original central image, and may generate 3D image data including the two frames.

The 3D image data may further include auxiliary data and metadata in addition to generated frame data. The auxiliary data may include at least one of depth image data corresponding to each viewpoint image, segmentation information, and transparency information. The metadata may include at least one of camera parameter information and depth range information.

The 3D image data may further include filter information including history information regarding the original left image and the original right image being processed to the processed left image and the processed right image. For example, an original resolution may be easily restored during a decoding process by including, in the 3D image data, filter information containing history information regarding a change in of a resolution of the processed left image and the processed right image generated by changing a resolution of the original left image and the original right image.

The image processing apparatus 100 may further include an image adder 150 to add two-dimensional (2D) image data to the original central image when a 2D image is added, to add stereo image data to the original left image and the original right image when a stereo image is added, and to add multi-view image data to the original central image, the original left image, and the original right image when a multi-view image is added. While outputting an image, the image processing apparatus 100 may play the image by adding another image of a different mode to the image or by editing the image. It will be further described with reference to FIG. 4.

Figure 4:
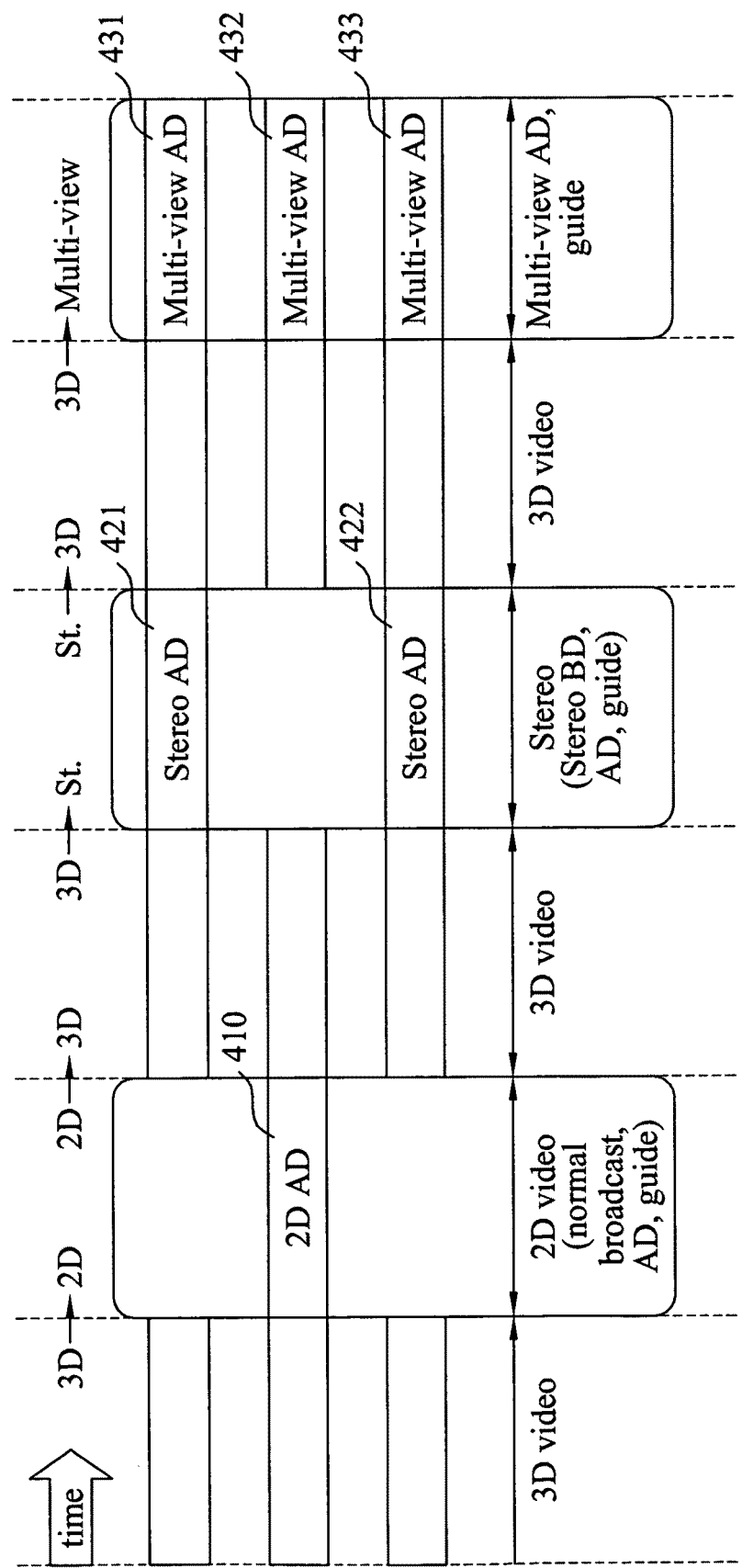
FIG. 4 illustrates a process of adding various data according to an embodiment.

FIG. 4 illustrates a process of adding various data according to an embodiment.

Referring to FIG. 4, when a 2D advertisement is desired to be added while outputting a multi-view 3D image, the 2D image may be added and be played by adding only a central image 410 without adding a left image and a right image. When a stereo advertisement is desired to be added while outputting the multi-view 3D image, the stereo advertisement may be added and be played by adding only a left image 421 and a right image 422 and by adding a central image as a null image. When a multi-view advertisement is desired to be added while outputting the multi-view 3D image, the multi-view advertisement may be added and be played by adding all of a left image 431, a central image 432, and a right image 433.

Referring again to FIG. 1, the image processing apparatus 100 may further include an encoder 140 to encode the 3D image data.

As described above, an image may be processed based on 3D image data where an original central image is configured as a single frame and a processed left image and a processed right image are configured as another frame. Accordingly, a high definition of image may be processed using minimum amounts of data.

Figure 5:
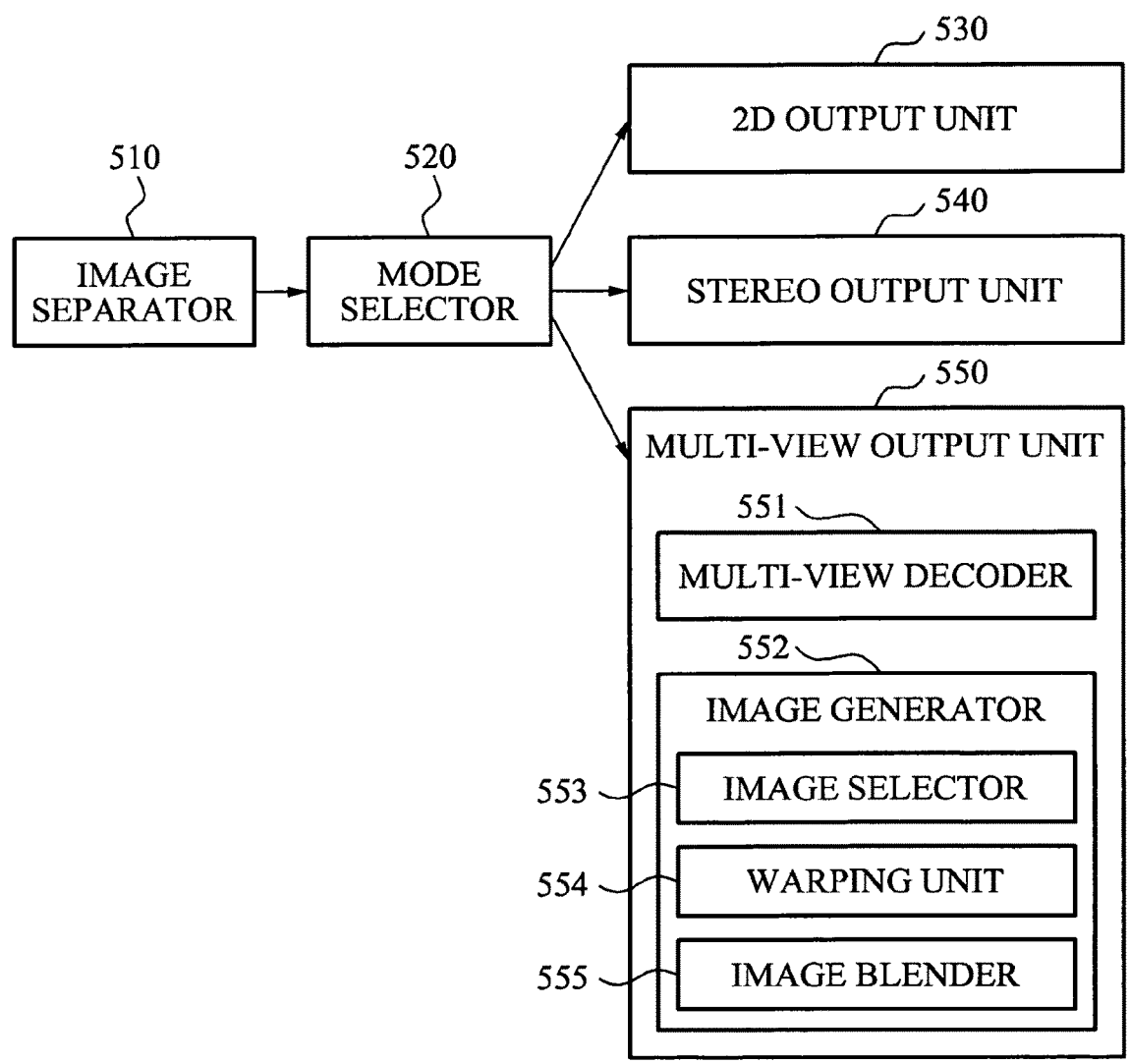
FIG. 5 illustrates an image processing apparatus to decode and output 3D image data according to another embodiment.

FIG. 5 illustrates an image processing apparatus 500 to decode and output 3D image data according to another embodiment.

Referring to FIG. 5, the image processing apparatus 500 to decode and output the 3D image data may include an image separator 510, a mode selector 520, a 2D output unit 530, a stereo output unit 540, and a multi-view output unit 550.

The image separator 510 may separate a first frame image and a second frame image from an encoded image. The first frame may be configured using an original central image, and the second frame may be configured using a processed left image and a processed right image processed from an original left image and an original right image. The processed left image may correspond to an image generated by reducing a vertical resolution of the original left image by half. The processed right image may correspond to an image generated by reducing a vertical resolution of the original right image by half. As described above, the processed left image and the processed right image may be generated by interlacing the original left image and the original right image, and may also be generated by arranging the original left image and the original right image into a checkerboard type. Also, the processed left image and the processed right image may be generated by reducing, by half, a vertical resolution of the original left image and the original right image. The generated processed left image and processed right image may be arranged within a single frame using various schemes, for example, a top and down scheme, a side by side scheme, and the like.

The mode selector 520 may select an output mode to output an image in various image output devices enabling the image to be output in various modes. For example, the various output modes may include a 2D output mode, a stereo output mode, a multi-view output mode, and the like.

The 2D output unit 530 may output a 2D image by decoding the first frame image when the selected output mode is a 2D output mode. Specifically, in the case of a 2D image output mode, since the 2D image may be configured by outputting only a central image, the 2D image may be output by decoding the first frame image including the central image.

The stereo output unit 540 may output a stereo image by decoding the second frame image when the selected output mode is a stereo output mode. Specifically, in the case of a stereo image output mode, since the stereo image may be configured by outputting only a left image and a right image, the stereo image may be output by decoding the second frame image including the left image and the right image.

The multi-view output unit 550 may output a multi-view image by decoding the first frame image and the second frame image and by generating at least one new viewpoint image when the selected output mode is a multi-view output mode. Specifically, in the case of a multi-view image output mode, since the multi-view image may be configured by outputting the central image, the left image, and the right image, the multi-view image may be output by decoding the first frame image including the central image and the second frame image including the left image and the right image.

The multi-view output unit 550 may include a multi-view decoder 551 to decode the first frame image and the second frame image, and an image generator 552 to generate at least one new viewpoint image. The image generator 552 may include an image selector 553, a warping unit 554, and an image blender 555.

To generate a new viewpoint image, the image selector 553 may determine, as a first image, one image selected from the processed left image and the processed right image. When the new viewpoint image is desired to be generated between the processed left image and an original central image, the image selector 553 may determine the processed left image as the first image. When the new viewpoint image is desired to be generated between the processed right image and the original central image, the image selector 553 may determine the processed right image as the first mage.

The warping unit 554 may three-dimensionally warp the first image and the original central image. The warping unit 554 may perform transformation to an inter-viewpoint based on depth image corresponding to the first image and the original central image.

The image blender 555 may blend an image for correcting a hole of the warped original central image. The image blender 555 may include an image interpolator (not shown) to restore an original resolution by interpolating the warped first image. The new viewpoint image may be generated by blending the interpolated first image and the warped original central image. The image interpolator may interpolate the first image based on filter information containing history information regarding the original left image or the original right image being processed. For example, the image interpolator may perform interpolation of restoring an original resolution based on history information used to generate the processed left image or the processed right image by changing a resolution of the original left image or the original right image.

As described above, an output image may be configured without losing an original resolution by processing an image based on image data maintaining the original resolution. Also, the image may be effectively processed without a change in an existing infra by generating 3D image data used to selectively play one of a 2D image, a stereo image, and a multi-view image, and by processing the image based on the 3D image data.

Figure 6:
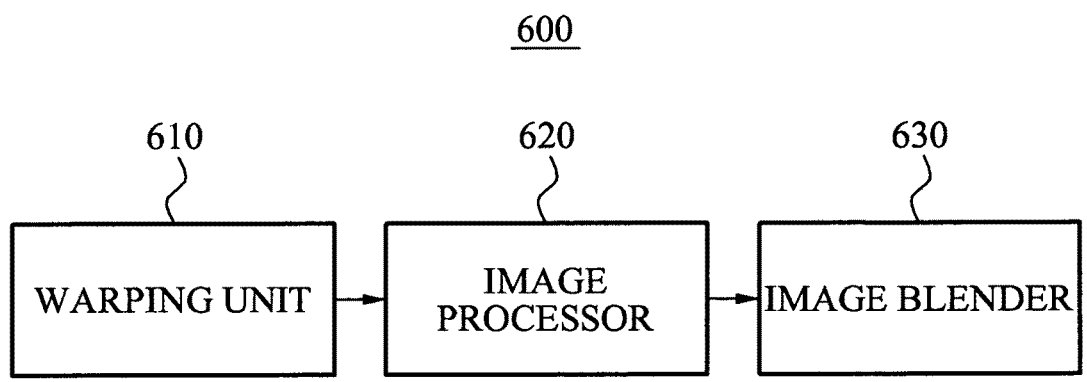
FIG. 6 illustrates an image processing apparatus to generate a new viewpoint image according to still another embodiment.

FIG. 6 illustrates an image processing apparatus 600 to generate a new viewpoint image according to still another embodiment.

Referring to FIG. 6, the image processing apparatus 600 to generate the new viewpoint image in order to play a multi-view image may include a warping unit 610, an image processor 620, and an image blender 630.

The warping unit 610 may three dimensionally warp a first viewpoint image of a first resolution and a second viewpoint of a second resolution. For example, inter-viewpoint images may be generated by performing 3D warping based on the first resolution of a central image, the second resolution of a right image, and corresponding depth image.

The image processor 620 may generate a correction image by processing the warped second viewpoint image. When the first viewpoint image corresponds to the central image, a resolution of the second viewpoint image reduced during an encoding process may become to be the same as the resolution of the original viewpoint image by interpolating the 3D warped second viewpoint image, for example, the right image in order to correct a hole area occurring during a 3D warping process of the central image.

The image blender 630 may generate a new viewpoint image by blending the warped first viewpoint image and the correction image. Accordingly, an enhanced new viewpoint image may be generated by correcting the hole area generated during the 3D warping process of the first viewpoint image.

Hereinafter, an example of generating the new viewpoint image will be further described with reference to FIG. 7.

Figure 7:
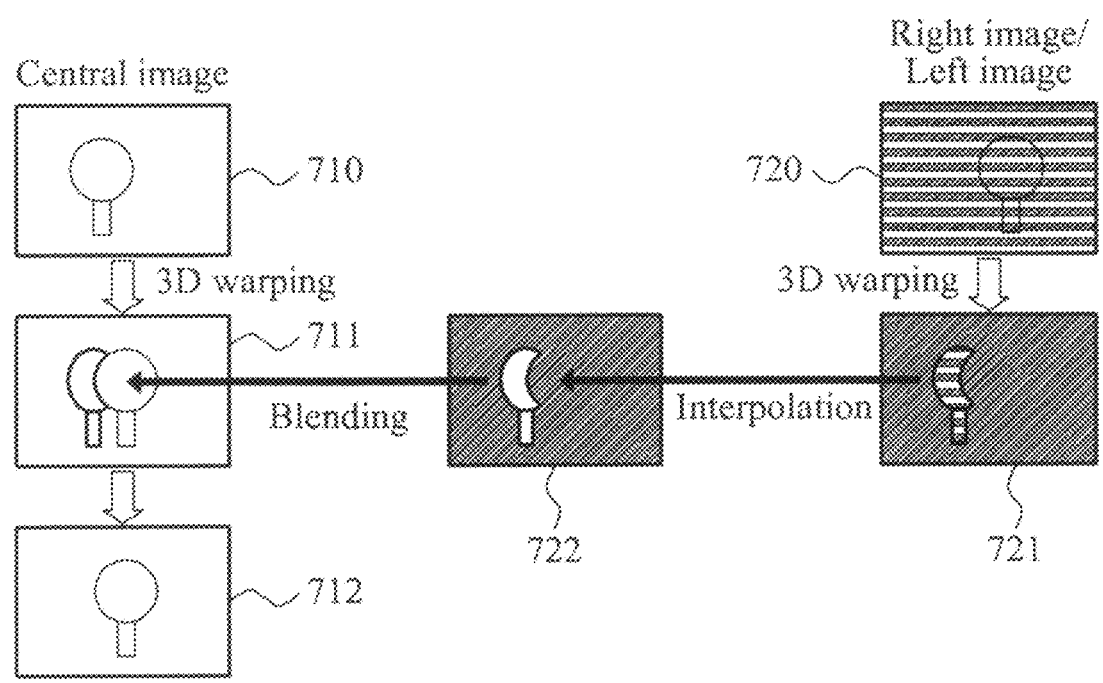
FIG. 7 illustrates a process of generating a new viewpoint image based on 3D image data according to an embodiment.

FIG. 7 illustrates a process of generating a new viewpoint image based on 3D image data according to an embodiment.

Referring to FIG. 7, the new viewpoint image may be generated between a central image 710 and a right image or a left image 720. The left image or the right image 720 may be selected depending on whether a location of a viewpoint to be generated is right or left based on the central image 710, and may be blended with the new viewpoint image. New viewpoint images 711 and 712 may be generated by three dimensionally warping the central image 710 and the selected left image or right image 720. Since a hole occurs during the 3D warping process of the central image 710, a correction image may be generated to remove the hole. In this instance, the correction image may be an image 722 generated by interpolating a new viewpoint image 721 with respect to the 3D warped left image or right image 720, and by restoring a resolution of a second viewpoint image reduced during an encoding process to be the same as a resolution of an original image.

Accordingly, the enhanced new viewpoint image may be finally generated by blending the restored image 722 and the new viewpoint image 711 with respect to the central image.

FIG. 8 illustrates an image processing method to generate 3D image data according to an embodiment.

In operation 810, an original left image, an original central image, and an original right image may be received.

In operation 820, a processed left image and a processed right image may be processed by processing the original left image and the original right image. The processed left image may correspond to an image generated by reducing a vertical resolution of the original left image by half, and the processed right image may correspond to an image generated by reducing a vertical resolution of the original right image by half.

In operation 830, 3D image data including a first frame image and a second frame image may be generated. Here, the first frame image may be configured using the original central image and the second frame image may be configured using the processed left image and the processed right image. The 3D image data may further include filter information including history information regarding the original left image and the original right image being processed to the processed left image and the processed right image. Also, the 3D image data may further include auxiliary data including at least one of depth image data corresponding to each viewpoint image, segmentation information, and transparency information, and metadata including at least one of camera parameter information and depth range information.

The generated 3D image data may be encoded through an encoding process and be transmitted to an image output device and the like.

Matters not described above with reference to FIG. 8 may refer to descriptions made above with reference to FIGS. 1 through 7.

By processing an image based on 3D image data where an original central image is configured as a single frame and a processed left image and a processed right image are configured as another frame, a high definition of image may be processed using minimum amounts of data, and an output image may be configured without loss in a resolution. Also, the image may be effectively processed without a change in an existing infra.

The image processing method according to the above-described exemplary embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined by the claims and their equivalents.

What is claimed is:

1. An image processing apparatus, comprising:
   an image separator to separate a first frame image and a second frame image from an encoded image;

a mode selector to select an output mode;

a 2D output unit to output a 2D image by decoding the first frame image when the selected output mode is a 2D output mode;

a stereo output unit to output a stereo image by decoding the second frame image when the selected output mode is a stereo output mode; and a multi-view output unit to output a multi-view image by decoding the first frame image and the second frame image and by generating at least one new viewpoint image when the selected output mode is a multi-view output mode, wherein the first frame image is configured using an original central image and the second frame image is configured using a processed left image and a processed right image obtained by processing an original left image and an original right image.

2. The image processing apparatus of claim 1, wherein:
the processed left image corresponds to an image generated by reducing a vertical resolution of the original left image by half, and
the processed right image corresponds to an image generated by reducing a vertical resolution of the original right image by half.

3. The image processing apparatus of claim 1, wherein:
the processed left image and the processed right image correspond to an odd image and an even image generated by interlacing the original left image and the original right image, and
the odd image includes odd lines of the interfaced original left image, and the even image includes even lines of the interfaced original right image.

4. The image processing apparatus of claim 1, wherein:
the processed left image and the processed right image correspond to a checkerboard left image and a checkerboard right image generated by arranging the original left image and the original right image in a checkerboard type, and
the checkerboard left image has half a resolution of the original left image, and the checkerboard right image has half a resolution of the original right image.

5. The image processing apparatus of claim 1, wherein the multi-view output unit comprises:
a multi-view decoder to decode the first frame image and the second frame image; and
an image generator to generate at least one new viewpoint image, and
the image generator comprises:
an image selector to determine, as a first image, one image selected from the processed left image and the processed right image;
a warping unit to three-dimensionally warp the first image and the original central image; and
an image blender to blend an image for correcting a hole of the warped original central image.

6. The image processing apparatus of claim 5, wherein the image blender comprises:
an image interpolator to restore an original resolution by interpolating the warped first image, and
a new viewpoint image is generated by blending the interpolated first image and the warped original central image.

7. The image processing apparatus of claim 6, wherein the image interpolator interpolates the first image based on filter information containing history information regarding the original left image or the original right image being processed.

\* \* \* \* \*